US009578589B2

United States Patent
Lu

(10) Patent No.: US 9,578,589 B2
(45) Date of Patent: Feb. 21, 2017

(54) MOBILE TERMINAL AND METHOD FOR COMMUNICATION CONTROL, AND ELECTRONIC DEVICE WITH COMMUNICATION FUNCTION

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yong-Liang Lu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/716,037

(22) Filed: May 19, 2015

(65) Prior Publication Data
US 2016/0295493 A1   Oct. 6, 2016

(30) Foreign Application Priority Data
Apr. 1, 2015   (CN) .......................... 2015 1 0153053

(51) Int. Cl.
| H04M 3/00 | (2006.01) |
| H04W 40/08 | (2009.01) |
| H04B 1/3883 | (2015.01) |
| H02J 7/00 | (2006.01) |
| H04W 40/12 | (2009.01) |

(52) U.S. Cl.
CPC .............. *H04W 40/08* (2013.01); *H02J 7/007* (2013.01); *H02J 7/0052* (2013.01); *H04B 1/3883* (2013.01); *H02J 2007/0062* (2013.01); *H04W 40/12* (2013.01)

(58) Field of Classification Search
CPC .... H04W 52/34; H04W 88/02; H04W 52/243; H04W 24/02; H04W 24/10
USPC .... 455/1, 63, 456.6, 556.1, 424, 522, 226.2, 455/414.1, 432.1
See application file for complete search history.

(56) References Cited

U.S. PATENT DOCUMENTS

| 5,640,646 | A | * | 6/1997 | Toyohara | ........... | G03G 15/2003 |
| | | | | | | 399/69 |
| 8,521,158 | B2 | * | 8/2013 | Karpoor | ................ | H04W 48/16 |
| | | | | | | 370/331 |
| 2008/0231447 | A1 | * | 9/2008 | Grossman | ............... | G01S 11/06 |
| | | | | | | 340/572.1 |

(Continued)

*Primary Examiner* — Joseph Arevalo
(74) *Attorney, Agent, or Firm* — Zhigang Ma

(57) ABSTRACT

A mobile terminal and a method for communication control are provided. The mobile terminal includes a communication device, a communication interface and a signal detector. The communication interface detects connection to a transmission device. Upon detecting that the communication interface is connected to a transmission device, the transmission power of the transmission device is compared with the communication device. Upon the transmission power of the transmission device being greater than the communication device; a strength of a current signal measured by the signal detector is obtained. The obtained strength of the current signal is compared with a preset value. Upon the obtained strength of the current signal being less than the preset value, a control command is sent to control the transmission device to transmit signals for the mobile terminal. An electronic device with communication function is also provided.

4 Claims, 3 Drawing Sheets

(56) References Cited

U.S. PATENT DOCUMENTS

| | | | | |
|---|---|---|---|---|
| 2010/0313241 A1* | 12/2010 | Lee | ............... | G06F 15/16 |
| | | | | 726/3 |
| 2011/0110309 A1* | 5/2011 | Bennett | ............... | H04L 12/2898 |
| | | | | 370/328 |
| 2012/0017257 A1* | 1/2012 | Lee | ............... | G09G 5/006 |
| | | | | 725/153 |
| 2012/0135728 A1* | 5/2012 | Karpoor | ............... | H04W 48/16 |
| | | | | 455/432.1 |
| 2012/0135777 A1* | 5/2012 | Karpoor | ............... | H04W 52/40 |
| | | | | 455/522 |
| 2013/0337789 A1* | 12/2013 | Johnson | ............... | H04W 4/02 |
| | | | | 455/414.1 |

\* cited by examiner

MOBILE TERMINAL AND METHOD FOR COMMUNICATION CONTROL, AND ELECTRONIC DEVICE WITH COMMUNICATION FUNCTION

CROSS-REFERENCE TO RELATED APPLICATIONS

This application claims priority to Chinese Patent Application No. 201510153053.1 filed on Apr. 1, 2015, the contents of which are incorporated by reference herein.

FIELD

The subject matter herein generally relates to communication control technology, and particularly to a mobile terminal and a method for communication control, and an electronic device with communication function.

BACKGROUND

Wireless communication quality is affected by various external factors, such as terrain, especially in remote areas. Furthermore, wireless communication quality will also be affected by power limitation of a transmission module which is configured to transmit signals.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
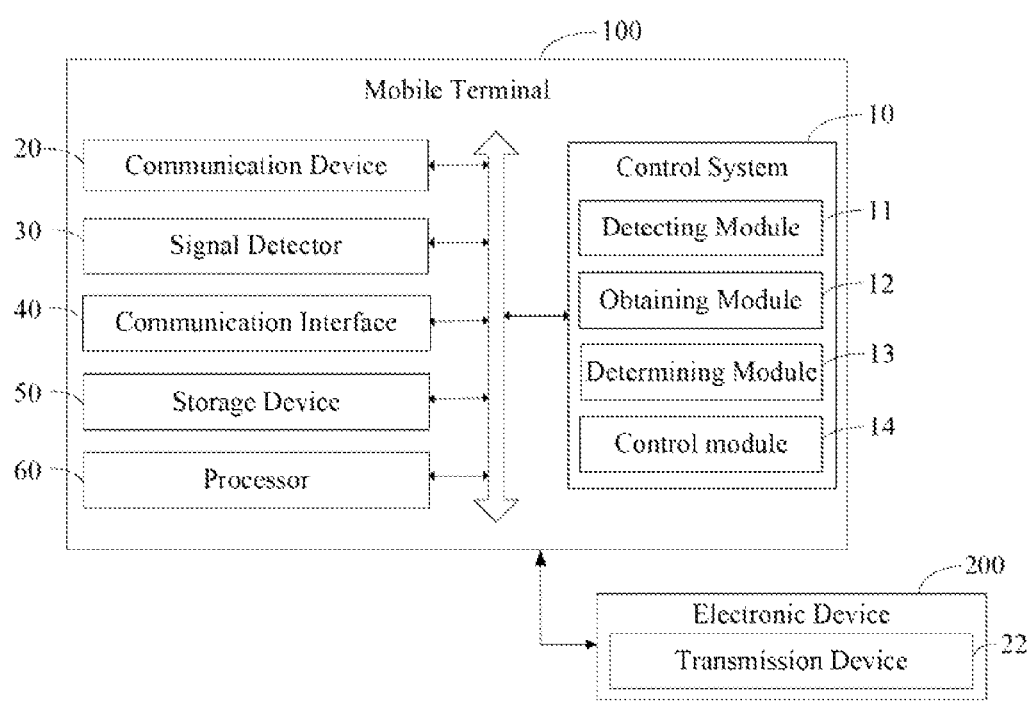
FIG. 1 is a block diagram of an embodiment of a mobile terminal including a system for communication control.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in details so as not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media includes CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of one embodiment of a mobile terminal. In at least one embodiment as shown in FIG. 1, a mobile terminal 100 includes, but is not limited to, a control system 10, a communication device 20, a signal detector 30, a communication interface 40, a storage device 50 and at least one processor 60. The mobile terminal 100 can be a tablet computer, a notebook computer, a smart phone, a personal digital assistant (PDA), or another suitable electronic device. FIG. 1 illustrates only one example of the mobile terminal 100 that can include more or fewer components than illustrated, or have a different configuration of the various components in other embodiments.

The communication device 20 can transmit signals for the mobile terminal 100. The signal detector 30 can detect and measure a strength of a current signal transmitted by the communication device 20. The communication interface 40 can be connected to an external power or an external transmission device, in the embodiment, the communication interface 40 is a universal serial bus (USB) interface.

In at least one embodiment, the storage device 50 can include various types of non-transitory computer-readable storage mediums. For example, the storage device 50 can be an internal storage system, such as a flash memory, a random access memory (RAM) for temporary storage of information, and/or a read-only memory (ROM) for permanent storage of information. The storage device 50 can also be an external system, such as a hard disk, a storage card, or a data storage medium. The at least one processor 60 can be a central processing unit (CPU), a microprocessor, or other data processor chip that performs functions of the control system 10 in the mobile terminal 100.

The control system 10 can select an external transmission device to transmit signals for the mobile terminal 100 when the mobile terminal 100 is connected to the external transmission device and the strength of the current signal transmitted by the communication device 20 is less than a preset value. The external transmission device can be an independent device, or be built into an electronic device, such as an electronic device 200 with communication function.

In at least one embodiment, the control system 10 can include a detecting module 11, an obtaining module 12, a determining module 13 and a control module 14. The function modules 11-14 can include computerized codes in the form of one or more programs, which are stored in the storage device 50. The at least one processor 60 executes the computerized codes to provide functions of the function modules 11-14.

The control module 14 set the communication device 20 as a default communication pathway for the mobile terminal 100.

The detecting module 11 detects whether the communication interface 40 is connected to a transmission device 22. If the communication interface 40 is connected to the transmission device 22, the obtaining module 12 obtains the transmission power of the transmission device 22 and the determining module 13 determines whether the transmission power of the transmission device 22 is greater than that of the communication device 20. If the communication interface 40 is not connected to the transmission device 22, the detecting module 11 continues detecting whether the communication interface 40 is connected to the transmission device 22 until the communication interface 40 is connected to the transmission device 22.

If the transmission power of the transmission device 22 is greater than that of the communication device 20, the control module 14 controls the signal detector 30 to detect and measure the strength of the current signal transmitted by the communication device 20, and the obtaining module 12 further obtains the strength of the current signal measured by the signal detector 30.

The determining module 13 determines whether the obtained strength of the current signal is less than a preset value. The preset value can be a default value or an appropriate value set by a user. In at least one embodiment, the preset value is −70 dB because the communication quality will be poor if the strength of the current signal is below −70 dB.

If the obtained strength of the current signal is less than the preset value, the control module 14 provides a user interface for a user to choose whether to switch the transmission device 22 to transmit signals for the mobile terminal 100. If the user chooses to switch the transmission device 22 to transmit signals for the mobile terminal 100, the control module 14 further overrides the default communication pathway to set the transmission device as an updated communication pathway for the mobile terminal 100.

Figure 2:
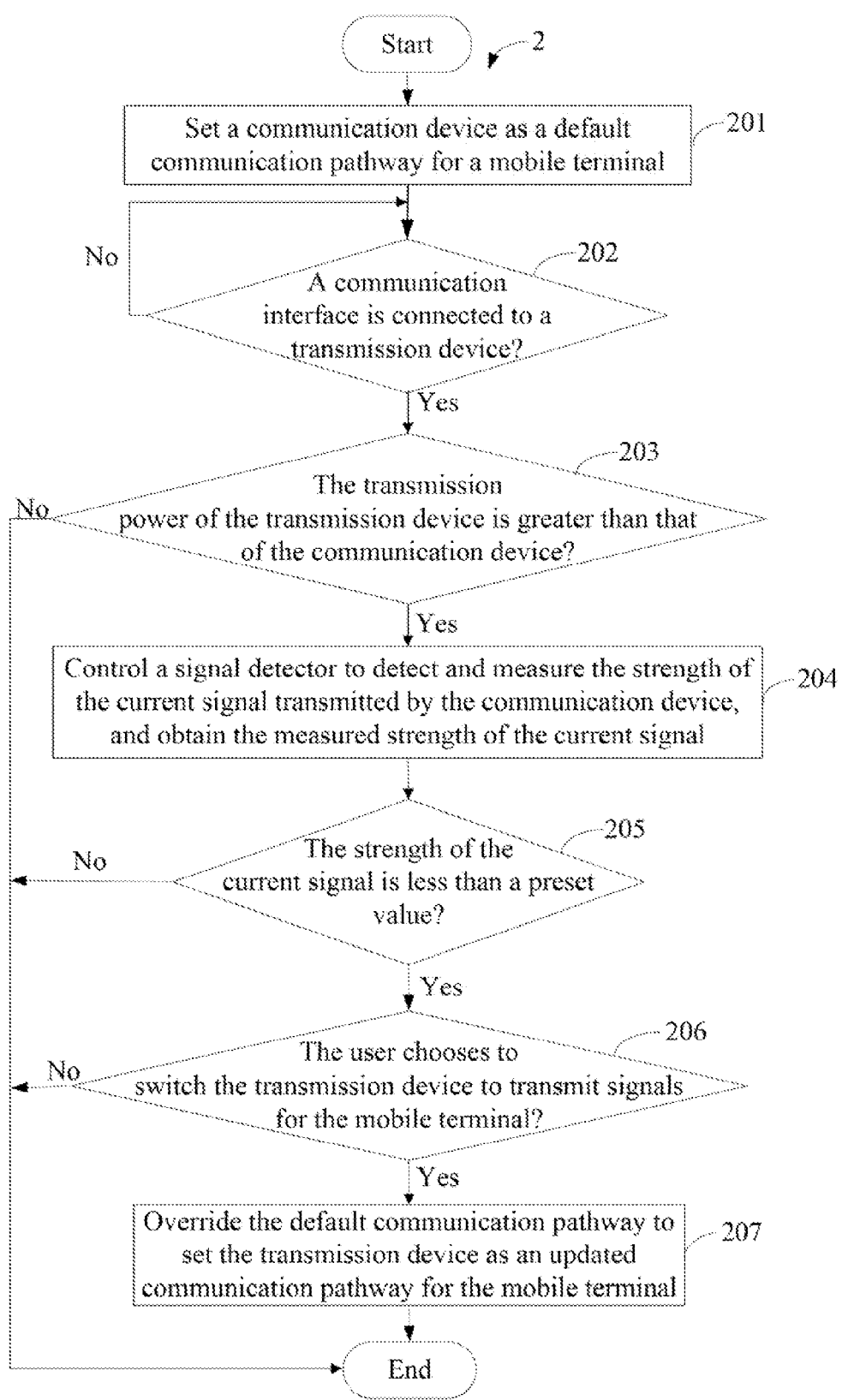
FIG. 2 illustrates a flowchart of an embodiment of a method for communication control in the mobile terminal of FIG. 1.

Referring to FIG. 2, a flowchart of a method for communication control is presented in accordance with an example embodiment. The example method 2 is provided by way of example, as there are a variety of ways to carry out the method. The example method 2 described below can be carried out using the configurations illustrated in FIG. 1 for example, and various elements of these figures are referenced in explaining example method 2. Each block shown in FIG. 2 represents one or more processes, methods, or subroutines carried out in the example method 2. Additionally, the illustrated order of blocks is by example only and the order of the blocks can be changed. The example method 2 can begin at block 201. Depending on the embodiment, additional steps can be added, others removed, and the ordering of the steps can be changed.

At block 201, a control module sets a communication device 20 as a default communication pathway for a mobile terminal 100.

At block 202, a detecting module detects whether a communication interface 40 is connected to a transmission device 22. If the communication interface 40 is connected to the transmission device 22, block 203 is implemented. Otherwise, if the communication interface 40 is not connected to the transmission device 22, block 202 is implemented continuously. That is to say, the detecting module will continue detecting whether the communication interface 40 is connected to the transmission device 22 until the communication interface 40 is connected to the transmission device 22.

At block 203, an obtaining module obtains transmission power of the transmission device 22 and a determining module determines whether the transmission power of the transmission device 22 is greater than that of a communication device 20. If the transmission power of the transmission device 22 is greater than that of the communication device 20, block 204 is implemented. Otherwise, if the transmission power of the transmission device 22 is less than that of the communication device 20, the flow is ended.

At block 204, the control module controls a signal detector 30 to detect and measure a strength of a current signal transmitted by the communication device 20, and the obtaining module obtains the strength of the current signal measured by the signal detector 30.

At block 205, the determining module determines whether the obtained strength of the current signal is less than a preset value. If the obtained strength of the current signal is less than the preset value, block 206 is implemented. Otherwise, if the obtained strength of the current signal is greater than the preset value, the flow is ended.

At block 206, a control module provides a user interface for a user to choose whether to switch the transmission device 22 to transmit signals for the mobile terminal 100. If the user chooses to switch the transmission device 22 to transmit signals for the mobile terminal 100, block 207 is implemented. Otherwise, if the user chooses not to switch the transmission device 22 to transmit signals for the mobile terminal 100, the flow is ended.

At block 207, the control module overrides the default communication pathway to set the transmission device 22 as an updated communication pathway for the mobile terminal.

With such a configuration, when the mobile terminal 100 is connected to an external transmission device whose transmission power is greater than that of the communication device 20, the external transmission device can be controlled to transmit signals for the mobile terminal 100.

Figure 3:
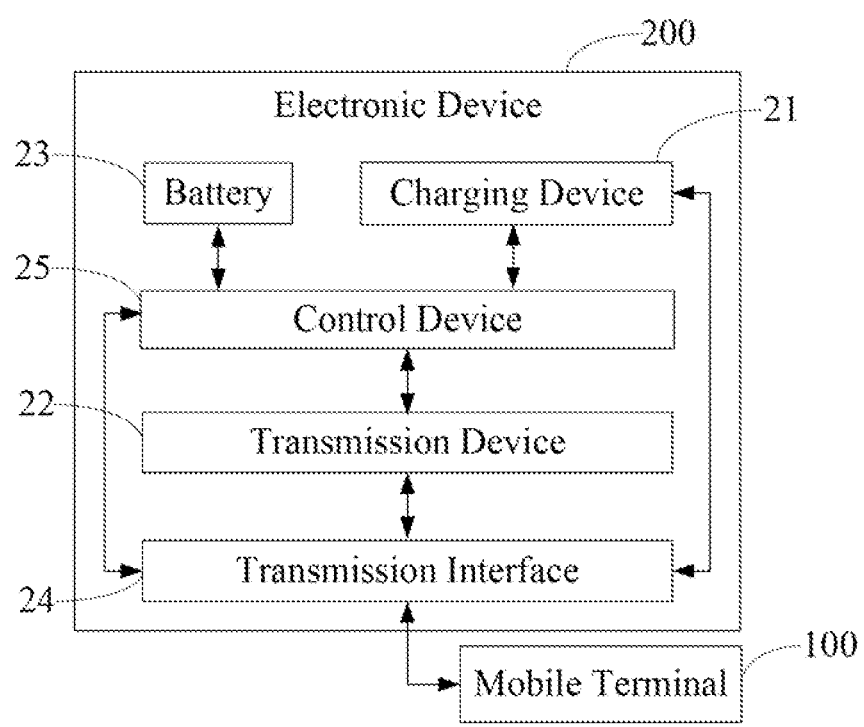
FIG. 3 is a block diagram of an embodiment of an electronic device with communication function.

FIG. 3 illustrates a block diagram of one embodiment of an electronic device with communication function. In at least one the embodiment as shown in FIG. 3, an electronic device 200 includes, but is not limited to, a charging device 21, a transmission device 22, a transmission interface 24 and a control device 25. In the embodiment, the electronic device 200 is a charger.

The charging device 21 is coupled to the transmission device 22 and the transmission interface 24 respectively. In the embodiment, the transmission interface 24 is a universal serial bus (USB) interface. When connected to an external power, the charging device 21 supplies power for the transmission device 22 and a mobile terminal 100 which is connected to the transmission interface 24.

The transmission device 22 is coupled to the transmission interface 24. In other embodiments, a switch is configured to connect the transmission device 22 to the transmission interface 24.

The control device 25 is coupled to the transmission interface 24. When receiving a control command transmitted by a mobile terminal 100, the control device 25 controls the transmission device 22 to transmit signals for the mobile terminal 100.

In some embodiments, the electronic device 200 further includes a battery 23; the control device 25 is further coupled to the charging device 21 and the battery 23 respectively. When the electronic device 200 is connected to an external power, the control device 25 controls the charging device 21 to supply power for the transmission device 22; when the electronic device 200 is not connected to an external power, the control device 25 controls the battery 23 to supply power for the transmission device 22. In other embodiments, the battery 23 is rechargeable and when the electronic device 200 is connected to an external power, the control device 25 controls the charging device 21 to recharge the battery 23.

It should be emphasized that above-described embodiment of the present disclosure, including any particular embodiments are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A mobile terminal comprising:
a communication device;
at least one processor coupled to the communication device; a communication interface coupled to the at least one processor; and
a non-transitory storage device that stores one or more programs which, when executed by the at least one processor, cause the at least one processor to:
set the communication device as a default communication pathway for the mobile terminal;
compare, in response to detecting that the communication interface is connected to an external transmission device, a transmission power of the external transmission device to a transmission power of the communication device;
measure, in response to the comparing showing that the transmission power of the external transmission device is greater than the transmission power of the communication device, a strength of a current signal transmitted by the communication device; and
in response to the measured strength of the current signal being less than the preset value, a user interface for a user to choose whether to switch the external transmission device to transmit signals for the mobile terminal;
override, in response to the measured strength of the current signal being less than a preset value, the default communication pathway to set the external transmission device as an updated communication pathway for the mobile terminal, thus the default communication pathway is replaced by the updated communication pathway;
override, when the user chooses to switch the external transmission device to transmit signals for the mobile terminal, the default communication pathway to set the external transmission device as an updated communication pathway for the mobile terminal.

2. The mobile terminal according to claim 1, wherein the communication interface is a universal serial bus (USB) interface.

3. A computer-implemented method for communication control, applied in a mobile terminal comprising a communication device and a communication interface, the method comprising:
setting the communication device as a default communication pathway for the mobile terminal;
comparing, in response to detecting that the communication interface is connected to a external transmission device, a transmission power of the external transmission device to a transmission power of the communication device;
measuring, in response to the comparing showing that the transmission power of the external transmission device is greater than the transmission power of the communication device, a strength of a current signal transmitted by the communication device; and
providing, in response to the measured strength of the current signal being less than the preset value, a user interface for a user to choose whether to switch the external transmission device to transmit signals for the mobile terminal;
overriding, in response to the measured strength of the current signal being less than a preset value, the default communication pathway to set the external transmission device as an updated communication pathway for the mobile terminal, thus the default communication pathway is replaced by the updated communication pathway;
overriding, when the user chooses to switch the external transmission device to transmit signals for the mobile terminal, the default communication pathway to set the external transmission device as an updated communication pathway for the mobile terminal.

4. A electronic device comprising:
a communication device;
a communication interface coupled to the at least one processor;
at least one processor coupled to the communication device and the communication interface; and
a storage device that stores one or more programs which, when executed by the at least one processor, cause the at least one processor to:
set the communication device as a default communication pathway for the electronic device;
detect whether the communication interface connects to an external transmission device;
obtain a transmission power of the external transmission device when the communication interface connects to an external transmission device;
compare the transmission power of the external transmission device to a transmission power of the communication device;
determine whether the transmission power of the external transmission device is greater than the transmission power of the communication device;
measure a strength of a current signal transmitted by the communication device when the transmission power of the external transmission device is determined to be greater than the transmission power of the communication device;
provide a user interface for choosing whether to switch the external transmission device to transmit signals for the mobile terminal when the measured strength of the current signal is determined to be less than the preset value;
determine whether a measured strength of the current signal is less than a preset value; and
override the default communication pathway to set the external transmission device as an updated communication pathway for the electronic device when the measured strength of the current signal is determined to be less than a preset value, thus the external transmission device transmitting signal for the electronic device;
override the default communication pathway to set the external transmission device as an updated communication pathway for the mobile terminal when the external transmission device is choose to switch to transmit signals for the mobile terminal.

* * * * *